: US006486361B1

United States Patent
Ehlers et al.

(10) Patent No.: US 6,486,361 B1
(45) Date of Patent: Nov. 26, 2002

(54) METHOD FOR PREPARING POLYETHER POLYOLS

(75) Inventors: Stephan Ehlers, West Chester, PA (US); Jörg Hofmann, Krefeld (DE); Manfred Dietrich, Frankfurt (DE); Pramod Gupta, Bedburg (DE); Christian Steinlein, Ratingen (DE); Horst Zwick, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/048,684

(22) PCT Filed: Jul. 25, 2000

(86) PCT No.: PCT/EP00/07097

§ 371 (c)(1),
(2), (4) Date: Mar. 20, 2002

(87) PCT Pub. No.: WO01/10933

PCT Pub. Date: Feb. 15, 2001

(30) Foreign Application Priority Data

Aug. 6, 1999 (DE) .......................... 199 37 114

(51) Int. Cl.⁷ ............................... C07C 41/03
(52) U.S. Cl. .................. 568/620; 502/172; 502/175
(58) Field of Search ............................ 568/620; 502/175

(56) References Cited

U.S. PATENT DOCUMENTS

| 3,404,109 A | 10/1968 | Milgrom | 260/611 |
|---|---|---|---|
| 3,829,505 A | 8/1974 | Herold | 260/611 B |
| 3,941,849 A | 3/1976 | Herold | 260/607 A |
| 4,472,560 A * | 9/1984 | Kuyper et al. | 526/113 |
| 5,158,922 A | 10/1992 | Hinney et al. | 502/175 |
| 5,482,908 A | 1/1996 | Le-Khac | 502/156 |
| 5,545,601 A | 8/1996 | Le-Khac | 502/156 |
| 5,627,120 A | 5/1997 | Le-Khac | 502/156 |
| 5,689,012 A | 11/1997 | Pazos et al. | 568/619 |
| 5,714,428 A | 2/1998 | Le-Khac | 502/159 |
| 5,767,323 A | 6/1998 | Televantos et al. | 568/613 |
| 5,777,177 A | 7/1998 | Pazos | 568/679 |
| 6,358,877 B1 * | 3/2002 | Flagler et al. | 502/150 |

FOREIGN PATENT DOCUMENTS

| EP | 0 892 002 | 1/1999 |
|---|---|---|
| WO | 99/19063 | 4/1999 |

* cited by examiner

*Primary Examiner*—Rosalynd Keys
(74) *Attorney, Agent, or Firm*—Joseph C. Gil; Lyndanne M. Whalen; Carolyn M. Sloane

(57) ABSTRACT

The invention relates to a process for the preparation of polyether polyols by means of double metal cyanide (DMC) catalysts, in which the induction phase is shortened markedly. By continuous dispensing of an alkylene oxide into the starter-catalyst mixture it is possible to achieve a substantial shortening of the induction phase by comparison with the batch-wise activation.

6 Claims, 1 Drawing Sheet

A : continuous dispensing

B : discontinuous dispensing

METHOD FOR PREPARING POLYETHER POLYOLS

This application is a 371 of PCT/EP00/07097, filed Jul. 25, 2000.

TECHNICAL FIELD OF THE INVENTION

The invention relates to a process for the preparation of polyether polyols by means of double metal cyanide (DMC) catalysis, in which the induction phase is shortened markedly.

BACKGROUND OF THE INVENTION

According to prior art polyether polyols are prepared by polyaddition of alkylene oxides to starter compounds having active hydrogen atoms, by means of metal hydroxide catalysis (for example KOH), see Ullmanns "Encyclopädie der technischen Chemie" [Encyclopaedia of Industrial Chemistry], Vol. 14, 1963, p. 49 et seq. The polyaddition reaction rates are very slow in this process. Depending on the reaction temperature, catalyst concentration and OH number of the polyether polyol prepared, in the prior art process monofunctional polyethers having terminal double bonds, so-called monools, form additionally and restrict the use of the product for subsequent polyurethane applications. Furthermore, after the polyaddition the base which was used must be removed. This can be achieved, for example, either by the addition of acids, by the use of neutralising adsorbers, ion exchangers or by other methods. The water of neutralisation which arises in this case and the salts which have formed must likewise be separated before further processing. This brief description of the process used according to the present state of the art illustrates the labour- and cost-intensive nature of polyether polyol preparation.

Double metal cyanide (DMC) catalysts for the preparation of polyether polyols have long been known (see, for example, U.S. Pat. Nos. 3,404,109, 3,829,505, 3,941,849 and 5,158,922). The use of these DMC catalysts for the preparation of polyether polyols in particular brings about a reduction in the proportion of monofunctional polyethers having terminal double bonds, so-called monools, by comparison with the conventional preparation of polyether polyols by means of basic catalysts. The polyether polyols thus obtained can be processed to high-grade polyurethanes (for example elastomers, foams, coatings). Improved DMC catalysts such as are described in EP-A 700 949, EP-A 761 708, WO 97/40086, WO 98/16310, DE-A 197 45 120, DE-A 197 57 574 and DE-A 198 10 269, for example, are additionally extremely highly active and enable polyether polyols to be prepared at very low catalyst concentrations (25 ppm or less), such that it is no longer necessary to separate the catalyst from the polyol.

Induction times which are sometimes protracted are a disadvantage of DMC-catalysed polyether polyol preparation. During this phase the chain is built up only very slowly, such that only a very poor space-time yield is achieved. This in turn means a reduction in the economic advantage afforded over the KOH-catalysed process by the more rapid polyaddition and substantially simplified working-up of the product.

One possibility of reducing the induction times resides in elevating the alkylene oxide concentration in the reactor. However, a high concentration of free alkylene oxide constitutes a major hazard potential, because catalyst activation may result in intensified liberation of heat and consequently uncontrolled temperature increases. This would lead to greater thermal loading of the polyol, such that on the one hand, product quality might be impaired, for example owing to higher viscosities or broader molecular weight distributions and, on the other hand, the catalyst activity could be reduced by accelerated ageing. In an extreme case, an uncontrolled temperature increase may even lead to adiabatic thermal decomposition of the polyether polyol.

In the light of the difficulties described in the section above, the reactor is normally (see, for example, WO 97/23544) charged only with part of the total quantity of alkylene oxide necessary for carrying out the reaction to the polyol. Then only after waiting until a pronounced pressure drop in the reactor signals that the catalyst is completely activated, is further alkylene oxide supplied to the reactor.

SUMMARY OF THE INVENTION

It has now surprisingly been found that the induction phase in DMC-catalysed polyether polyol preparation can be shortened markedly if small quantities of alkylene oxide are supplied in continuous manner during the induction phase also, preferably quantities such that a constant pressure prevails in the reactor. The quantity of free alkylene oxide used for activation should here be oriented on the basis of either the maximum permissible reactor temperature ($T_{max}$) or, if this is above the decomposition temperature of the polyether polyol to be prepared, on the basis of the decomposition temperature ($T_{max}$) thereof. The threshold concentration ($C_{threshold}$) of free alkylene oxide in the reactor can be calculated as a function of the reaction temperature ($T_{reaction}$) and the reaction enthalpy ($\Delta H_R$), in accordance with the following formula:

$$C_{threshold} \leq T_{max} - T_{reaction}/\Delta H_R$$

DETAILED DESCRIPTION OF THE INVENTION

Figure 1:
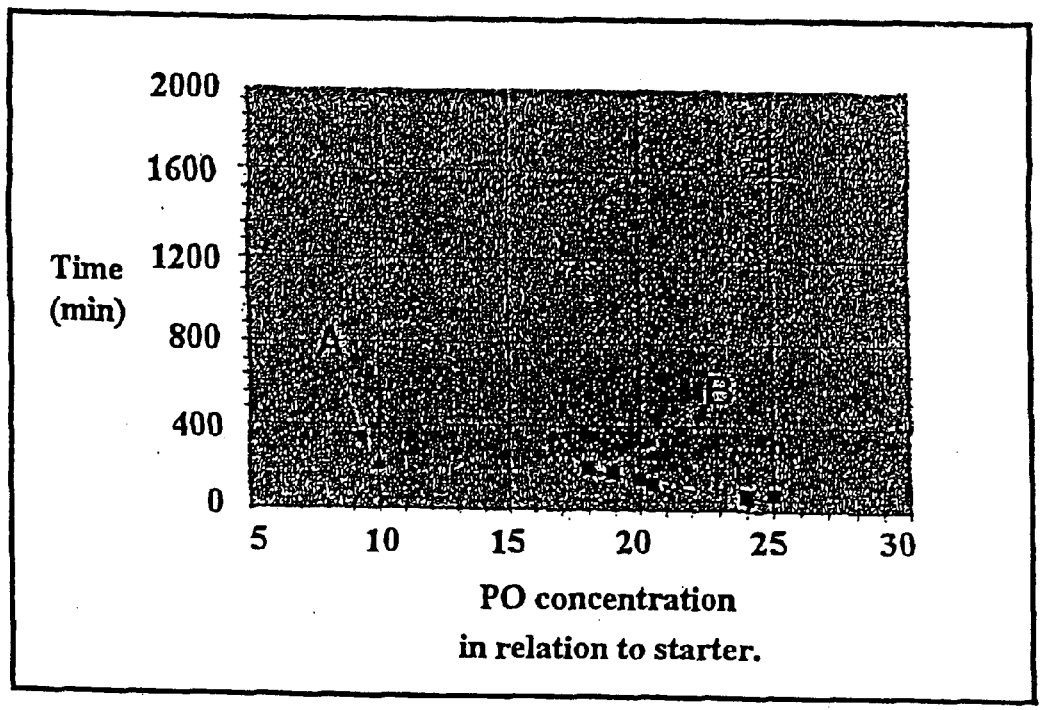
FIG. 1 is graph in which the concentration of propylene oxide in relation to starter compound added in a continuous system and a discontinuous system is plotted against time.

The invention therefore provides a process for the preparation of polyether polyols by DMC-catalysed polyaddition of alkylene oxides to starter compounds having active hydrogen atoms, in which alkylene oxide is supplied in continuous manner to the reactor during the induction phase. The total quantity of starter compound and catalyst necessary for the preparation of the polyether polyols is preferably in the initial reactor charge on commencement of the reaction. The alkylene oxide is preferably added such that the pressure in the reactor is held constant during the induction phase.

The DMC catalyst is activated during the induction phase generally at temperatures of from 20 to 200° C., preferably within the range 40 to 180° C., particularly preferably at temperatures of from 50 to 150° C. The reaction can in this phase be carried out at total pressures of from 0.001 to 20 bar, preferably at total pressures of from 0.5 to 10 bar and particularly preferably at total pressures of from 1 to 6 bar.

The induction time is characterised in that only very small quantities of alkylene oxide need be dispensed-in in order to hold the reactor pressure constant. The catalyst activity increases slowly in this phase, such that the quantity being dispensed-in can be increased gradually. Complete activation of the catalyst is recognisable by the fact that the alkylene oxide dispensing rate can be increased markedly without a pressure rise being observed simultaneously in the reactor. After complete activation of the catalyst the polyaddition commences, frequently proceeding so rapidly that the dispensing rate is limited only by the heat transfer rate of the reactor or of an external heat transfer means. FIG. 1 shows that a markedly more rapid activation of the catalyst can be achieved by this process as compared with discontinuous dispensing.

With a 10 wt. % free alkylene oxide content, in relation to the mass of the starter used, the induction time which can be achieved with continuous dispensing is comparable to that achieved with an approx. 18 wt. % content and discontinuous dispensing. The catalyst induction time is followed by the alkoxylation phase of the DMC mixture. In this phase control of the reaction is generally no longer by way of the reactor pressure but by way of the reactor temperature. The dispensing rate is therefore frequently limited, because of the high catalyst activity, by the heat transfer rate of the reactor or of a heat transmission means switched in the by-pass.

The DMC catalysts suitable for the process according to the invention are known in principle and are described in detail in the prior art indicated hereinabove. Improved, high-activity DMC catalysts described, for example, in EP-A 700 949, EP-A 761 708, WO 97/40086, WO 98/16310, DE-A 197 45 120, DE-A 197 57 574 and DE-A 198 10 269 are preferably used. A typical example is the DMC catalysts described in DE-A 198 10 269, which in addition to a double metal cyanide compound (for example zinc hexacyanocobaltate(III)) and an organic complexing ligand (for example tert.-butanol) also contain an ethylene oxide polyether having a number-average molecular weight greater than 500 g/mol.

Alkylene oxides which are preferably used are ethylene oxide, propylene oxide, butylene oxide and mixtures thereof. The building of the polyether chains by alkoxylation can be carried out, for example, with only one epoxide monomer or alternatively in random or block manner with 2 or 3 different epoxide monomers. More detailed information is contained in Ullmanns "Encyclopädie der industriellen Chemie" [Encyclopaedia of Industrial Chemistry], Vol. A21, 1992, p. 670 et seq.

The starter compounds having active hydrogen atoms, which are preferably used are compounds having molecular weights of 18 to 2,000 g/mol, preferably 200 to 2,000 g/mol, and 1 to 8, preferably 2 to 6 hydroxyl groups. The following may be named as examples: butanol, ethylene glycol, diethylene glycol, triethylene glycol, 1,2-propylene glycol, 1,4-butanediol, 1,6-hexanediol, bisphenol A, trimethylolpropane, glycerol, pentaerythritol, sorbitol, sucrose, degraded starch or water.

Starter compounds having active hydrogen atoms, such as have been prepared, for example, by conventional alkali catalysis from the aforementioned low molecular weight starters and represent oligomer alkoxylation products having number average molecular weights of 200 to 2,000 g/mol, are more advantageously used.

Propoxylated oligomer starter compounds having 1 to 8 hydroxyl groups, particularly preferably 2 to 6 hydroxyl groups, and number average molecular weights of 200 to 2,000 g/mol are preferably used. These compounds can be prepared, for example, in accordance with Ullmanns "Encyclopädie der industriellen Chemie" [Encyclopaedia of Industrial Chemistry], Vol. A21, 1992, p. 670 et seq.

The DMC-catalysed polyaddition of the alkylene oxide to the starter compounds generally takes place at temperatures of from 20 to 200° C., preferably within the range 40 to 180° C., particularly preferably at temperatures of from 50 to 150° C. The reaction may be carried out at total pressures of from 0.001 to 20 bar. The polyaddition may be carried out with the components as such or in an inert organic solvent such as toluene or THF. The quantity of solvent is normally from 10 to 30 wt. %, in relation to the quantity of polyether polyol to be prepared.

The DMC catalyst concentration is selected such that under the given reaction conditions good control of the polyaddition is possible. The catalyst concentration is generally within the range 0.0005 wt. % to 1 wt. %, preferably within the range 0.001 wt. % to 0.1 wt. %, particularly preferably within the range 0.001 to 0.01 wt. %, in relation to the quantity of polyether polyol to be prepared.

The molecular weights of the polyether polyols prepared by the process according to the invention are within the range 1,000 to 100,000 g/mol, preferably within the range 1,500 to 50,000 g/mol, particularly preferably within the range 2,000 to 20,000 g/mol.

High molecular weight polyether alcohols are very important as starting products for polyurethane preparation. Depending on molecular weight and functionality, they are preferably used for the preparation of elastomers, prepolymers for dispersions, soft foams and polyurethane coatings.

EXAMPLES

Preparation of High-activity DMC Catalyst (Synthesis According to EP-A 700 949)

A solution of 12.5 g (91.5 mmol) zinc chloride in 20 ml deionised water is added, with vigorous stirring (24,000 rpm), to, a solution of 4 g (12 mmol) potassium hexacyanocobaltate in 70 ml deionised water. Immediately afterwards a mixture prepared from 50 g tert.-butanol and 50 g deionised water is added to the suspension which has formed, followed by vigorous stirring (24,000 rpm) for 10 min. A mixture prepared from 1 g polypropylene glycol having a number average molar mass of 2,000 g/mol, 1 g tert.-butanol and 100 g deionised water is then added, and stirring (1,000 rpm) takes place for 3 min. The solid is isolated by filtration then stirred (10,000 rpm) for 10 min. with a mixture prepared from 70 g tert.-butanol, 30 g deionised water and 1 g of the above polypropylene glycol, and is filtered again. Finally, it is stirred again (10,000 rpm) for 10 min. with a mixture prepared from 100 g tert.-butanol and 0.5 g of the above polypropylene glycol. After filtration the catalyst is dried at 50° C. and standard pressure until the weight is constant.

Yield of dried, pulverulent catalyst: 6.23 g

Example 1

Preparation of Polyether Polyols with Continuous Dispensing of Propylene Oxide 2696 g of a polyether of molecular weight 416 g/mol and 0.4 g DMC catalyst are placed in a 20-litre reactor and heated to 105° C. After the reactor has been rendered inert, 268 g propylene oxide (corresponding to 10% of the starter used) are added. The pressure is then 2.3 bar absolute. This pressure is held constant during the activation phase by continuous dispensing of propylene oxide. The complete activation of the catalyst (corresponds to the end of the induction time) is recognisable by a marked increase in the dispensing rate. The temperature is held constant during the reaction. After activation of the catalyst, the remaining quantity (10,000 g) of propylene oxide is added at a dispensing rate of 4.6 kg/h. The polyether thus prepared has a viscosity η=384 mPas (25° C.), OH number=55.3 mg KOH/g, double bond content=5 mmol/kg. The induction time is 224 min.

Example 2 (Comparison Example)
Preparation of Polyether Polyols with Discontinuous Dispensing of Propylene Oxide During the Induction Phase 2724 g of a polyether of molar mass 416 g/mol and 0.4 g DMC catalyst are placed in a 20-litre reactor and heated to 105° C. After the reactor has been rendered inert, 545 g propylene oxide (corresponding to 20 wt. %, in relation to the mass of the starter used) are added. The pressure is then 3.4 bar absolute. Activation of the catalyst is recognisable by a more rapid fall in pressure. The temperature is held constant during the reaction. After activation of the catalyst the remaining quantity (10,234 g) of propylene oxide is added at a dispensing rate of 4.6 kg/h. The polyether thus prepared has the following properties: viscosity $\eta$=382 mPas (25° C.), OH number=55.2 mg KOH/g, double bond content=5 mmol/kg. The induction time is 144 min.

Further comparison experiments with this dispensing variant demonstrate that although the activation time can be reduced by increasing the concentration of free propylene oxide in the reactor, it is at the expense of the safety of the system. The reduction of the alkylene oxide concentration to, for example, 10 wt. % fulfils no purpose in the discontinuous process variant, because in this case the induction times become so great that little or even no economic benefit remains. As is shown in FIG. 1, using the process according to the invention the concentration of free alkylene oxide for catalyst activation can be reduced without problems to 10 wt. % under the given reaction conditions, with activation times being obtained which are comparable with those of the discontinuous activation using approx. 18 wt. % alkylene oxide, in relation to the mass of the starter used.

What is claimed is:

1. A process for preparing a polyether polyol by the polyaddition of an alkylene oxide onto a starter compound in the presence of a double-metal cyanide catalyst wherein the double-metal cyanide catalyst is activated in a reactor by the continuous addition of alkylene oxide into the reactor, with the proviso that the pressure of the reactor is constant during the activation of the double-metal cyanide catalyst.

2. The process according to claim 1, wherein the pressure of the reactor during the activation of the double-metal cyanide catalyst is from 1 to 6 bar.

3. The process according to claim 1, wherein the total amount of starter compound and double-metal cyanide catalyst used to prepare the polyether polyol is present in the reactor upon commencement of the activation of the double-metal cyanide catalyst.

4. The process according to claim 1, wherein the starter compound has from 1 to 8 hydroxyl groups and a molecular weight of 18 to 2,000 g/mol.

5. The process according to claim 1, wherein the starter compound is a propoxylated oligomer having a number average molecular weight of from 200 to 2,000 g/mol and from 1 to 8 hydroxyl groups.

6. The process of claim 1, wherein the double-metal cyanide catalyst is present in an amount from about 0.001 wt. % to about 0.1 wt. %, based on the total weight of the polyether polyol.

* * * * *